United States Patent
Bruchmann et al.

(10) Patent No.: US 7,939,583 B2
(45) Date of Patent: May 10, 2011

(54) LIQUID PRINTING INKS FOR FLEXOGRAPHIC AND/OR GRAVURE PRINTING USING HYPERBRANCHED POLYMERS AS BINDERS

(75) Inventors: Bernd Bruchmann, Freinsheim (DE); Joelle Bedat, Strasbourg (FR); Jürgen Kaczun, Niederkirchen (DE); Peter Poganiuch, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/370,099

(22) Filed: Feb. 12, 2009

(65) Prior Publication Data

US 2009/0149575 A1 Jun. 11, 2009

Related U.S. Application Data

(62) Division of application No. 10/399,255, filed as application No. PCT/EP01/12520 on Oct. 30, 2001, now Pat. No. 7,511,085.

(30) Foreign Application Priority Data

Oct. 31, 2000 (DE) .................................. 100 53 862
May 30, 2001 (DE) .................................. 101 26 201

(51) Int. Cl.
*C09D 11/00* (2006.01)
(52) U.S. Cl. ........ 523/160; 523/161; 524/555; 524/589; 524/590; 524/601; 524/612
(58) Field of Classification Search .................. 523/160, 523/161; 524/555, 589, 590, 601, 612
See application file for complete search history.

(56) References Cited

U.S. PATENT DOCUMENTS

| | | | |
|---|---|---|---|
| 4,155,892 A | 5/1979 | Emmons et al. ....... 260/29.2 TN |
| 4,666,984 A | 5/1987 | Carlick et al. ................ 525/131 |
| 5,120,361 A | 6/1992 | Winnik et al. .................. 106/22 |
| 5,136,004 A | 8/1992 | Figuly ........................ 528/272 |
| 5,254,159 A | 10/1993 | Gundlach et al. .......... 106/22 H |
| 5,266,106 A | 11/1993 | Breton ........................ 106/22 K |
| 5,319,052 A | 6/1994 | Prantl et al. ..................... 528/48 |
| 5,389,130 A | 2/1995 | Batlaw et al. .............. 106/31.26 |
| 5,534,049 A | 7/1996 | Wallstrom et al. ............ 524/487 |
| 5,556,925 A | 9/1996 | Kousaka et al. .............. 525/440 |
| 5,605,750 A | 2/1997 | Romano et al. ............ 428/32.17 |
| 5,646,200 A | 7/1997 | Duncan ......................... 523/160 |
| 5,886,091 A | 3/1999 | Harris et al. ................... 524/590 |
| 5,936,055 A | 8/1999 | Elwell et al. .................... 528/44 |
| 5,981,684 A | 11/1999 | Bruchmann et al. ............ 528/45 |
| 6,096,801 A | 8/2000 | Vincent et al. ................ 523/161 |
| 6,187,897 B1 | 2/2001 | Kawashima et al. ......... 528/310 |
| 6,214,963 B1 | 4/2001 | Noguchi et al. ................ 528/71 |
| 6,251,175 B1 | 6/2001 | Zhu et al. ................... 106/31.58 |
| 6,252,025 B1 | 6/2001 | Wang et al. ................ 526/292.9 |
| 6,258,155 B1 | 7/2001 | Guistina et al. ............ 106/31.75 |
| 6,262,207 B1 | 7/2001 | Rao et al. ....................... 526/224 |
| 6,372,841 B1 | 4/2002 | Anderson et al. ............. 524/507 |
| 6,376,637 B1 | 4/2002 | Bruchmann et al. ............ 528/60 |
| 6,518,370 B2 | 2/2003 | Abuelyaman et al. ........ 525/437 |
| 6,806,301 B2 | 10/2004 | Latunski et al. .............. 523/160 |
| 7,034,065 B2 | 4/2006 | Wang et al. ................... 523/160 |
| 7,151,153 B2 | 12/2006 | Bruchmann et al. ............ 528/75 |
| 7,511,085 B2 | 3/2009 | Bruchmann et al. .......... 523/160 |
| 2003/0092797 A1 | 5/2003 | Wang et al. ................... 523/161 |
| 2003/0118747 A1 | 6/2003 | Blum et al. .................... 427/557 |
| 2007/0060734 A1 | 3/2007 | Bruchmann et al. ............ 528/75 |

FOREIGN PATENT DOCUMENTS

| | | |
|---|---|---|
| DE | 199 04 444 | 8/2000 |
| DE | 100 04 495 | 8/2001 |
| DE | 100 23 229 | 11/2001 |
| EP | 0 451 657 | 10/1991 |
| EP | 0 835 890 | 4/1998 |
| EP | 0 870 789 | 10/1998 |
| EP | 0 882 772 | 12/1998 |
| EP | 0 899 286 | 3/1999 |
| EP | 0 899 287 | 3/1999 |
| GB | 2324797 | 4/1995 |
| JP | 55/120680 | 11/1978 |
| JP | 03/296577 | 12/1991 |
| JP | 11/166148 | 6/1999 |
| WO | WO 96/13558 | 5/1996 |
| WO | WO 97/03137 | 1/1997 |
| WO | WO 97/49774 | 10/1997 |
| WO | WO 98/36001 | 8/1998 |
| WO | WO 00/77070 | 12/2000 |
| WO | WO 01/57149 | 8/2001 |
| WO | WO 01/85820 | 11/2001 |

OTHER PUBLICATIONS

RD 365035 (Sep. 10, 1994): "Blocked isocyanate-terminated dendritic macromolecules are new".
"Printing Inks" Ullmann's Encyclopedia of Industrial Chemistry, 6th Ed, 1990.
JMS Rev. Nacromol. Chem. Phys. C27(3), 555-579 (1997).

*Primary Examiner* — Bernard Lipman
(74) *Attorney, Agent, or Firm* — Novak Druce + Quigg LLP

(57) ABSTRACT

Liquid printing inks for flexographic and/or gravure printing comprise solvents, colorants, if required additives, and, as a binder, at least one hyperbranched polymer having functional groups. Printing lacquers for priming unprinted print media or overcoating printed print media comprise solvents, if required additives, and, as a binder, at least one hyperbranched polymer having functional groups. Such hyperbranched polymers are used for the preparation of printing inks and of printing lacquers.

20 Claims, No Drawings

LIQUID PRINTING INKS FOR FLEXOGRAPHIC AND/OR GRAVURE PRINTING USING HYPERBRANCHED POLYMERS AS BINDERS

This is a Divisional Application of Application Ser. No. 10/399,255, filed on Apr. 14, 2003, now U.S. Pat. No. 7,511,085, the entire disclosure of which is herewith incorporated by reference, which is a National Stage Application under 35 U.S.C. §371, of International Application No. PCT/EP 01/12520, filed on Oct. 30, 2001, the entire disclosure of which is herewith incorporated by reference.

The present invention relates to liquid printing inks for flexographic and/or gravure printing, comprising solvent, colorant, if required additives and, as a binder, at least one hyperbranched polymer having functional groups. In a second aspect, the present invention relates to printing lacquers for priming unprinted print media or overcoating printed print media, comprising solvent, if required additives and, as a binder, at least one hyperbranched polymer having functional groups. The present invention furthermore relates to the use of hyperbranched polymers having functional groups for the preparation of printing inks or printing lacquers.

In mechanical printing processes, such as offset printing, letterpress printing, flexographic printing or gravure printing, the printing ink is transferred to the print medium by contact of a printing plate provided with printing ink with the print medium. Printing inks for these applications usually comprise solvent, colorant, binder and, if required, various additives. Binders serve for the formation of the ink film and for anchoring the components, for example pigments or fillers, in the ink film. Depending on the consistency, printing inks for these applications usually contain from 10 to 50% by weight of binder. The printing processes described are particularly suitable for printing long print runs or large quantities. Print runs of several 100,000 copies are not a rarity. In addition to the various technical requirements, printing inks for these applications therefore also have to be very economical.

Printing lacquers are either applied as a primer to the print medium or applied to the printed print medium as a coat after the printing process. Printing lacquers are used, for example, for protecting the print, for improving the adhesion of the printing ink to the print medium or for esthetic purposes. The application is usually effected inline by means of a coating unit on the printing press. Printing lacquers contain no colorant but, apart from this generally have a composition similar to that of printing inks.

Printing inks for mechanical printing processes comprise pasty printing inks having a high viscosity for offset and letterpress printing and liquid printing inks having a comparatively low viscosity for flexographic and gravure printing.

For pasty printing inks, high-boiling mineral oils are generally used as solvents. Frequently used binders are natural substances or modified natural substances, for example drying vegetable oils or natural resins, such as rosins.

For liquid printing inks, low-viscosity and comparatively low-boiling solvents, for example ethanol, water or toluene, are used. Binders preferably used are synthetically prepared polymers, for example nitrocellulose, polyamides, polyvinylbutyral or polymers. Further details are disclosed, for example, in Printing Inks, Ullmann's Encyclopedia of Industrial Chemistry, Sixth Edition, 1999 Electronic Release.

An important application of liquid printing inks is in the printing of industrial packaging. A large number of different print media are used for the production of packaging materials, for example cardboard boxes, carrier bags, heavy-duty bags, packaging for frozen products or gift-wrapping papers. Examples of such print media are paper, cardboard, board, corrugated board, films of polymers, such as polyethylene, polypropylene, polyamide or polyethylene terephthalate, metal foils, for example aluminum foils, and furthermore laminated packaging which consists of a plurality of layers of different materials, for example those comprising PET films and aluminum foils.

During printing on nonabsorptive print media, for example polymer films or metal foils, the printing ink cannot of course penetrate into the print medium, but a dried film remains on the print medium after the solvent has evaporated. Printing inks for such print media must therefore have very good film-forming properties and very particularly good abrasion resistance, crease-resistance, scratch-resistance and adhesive strength, so that the print film does not become detached from the substrate under mechanical stress. Printing inks comprising conventional binder do not have sufficient adhesive strength on many print media so that adhesion promoters, such as specific silanes or titanates, have to be added. Reference may be made here to U.S. Pat. No. 5,646,200 by way of example. For economic reasons and for simplifying the formulation, it is desirable to be able to dispense with this addition. Moreover, it is generally desirable to keep the proportion of components of the printing ink which have a low molecular weight and are therefore in principle capable of migration as small as possible. Moreover, the adhesion is not satisfactory on all print media even with the addition of adhesion promoters, so that there is a need for improvement here. Dendrimers, arborols, starburst polymers or hyperbranched polymers are designations for polymeric structures which are distinguished by a branched structure and high functionality. Dendrimers are macromolecules which are uniform in terms of their molecular and structural composition and have a highly symmetrical structure. They are produced in multistage syntheses and are accordingly very expensive.

In contrast, hyperbranched polymers are nonuniform both in terms of molecular composition and structurally. They exhibit branching and have branches of different lengths. $AB_x$ monomers are particularly suitable for synthesizing hyperbranched polymers. Said monomers have two different functional groups A and B which are capable of reacting with one another with formation of a link. The functional group A is present only once per molecule and the functional group B two times or more. As a result of the reaction of said $AB_x$ monomers with one another, uncrosslinked polymers having regularly arranged branching points form. The polymers have virtually exclusively B groups at the chain ends. Further details are disclosed, for example, in J.M.S.—Rev. Macromol. Chem. Phys., C37(3), 555-579 (1997).

Dendrimeric amines have been proposed as assistants, such as dispersants or stabilizers, for inkjet inks, as disclosed by U.S. Pat. Nos. 5,120,361, 5,254,159, 5,266,106, WO 97/03137, WO 97/49774 or WO 98/36001. U.S. Pat. No. 6,096,801 discloses the use of dendrimers as dispersants for pigment preparations of specific organic pigments which in turn can be used as colorants for printing inks. In view of the poor availability and the high price, however, only small amounts of dendrimers are used in such applications.

EP-A 899 286 discloses radiation-curable compositions of monomers or reactive diluents and prepolymers, in which conventional crosslinkable prepolymers are replaced by specific crosslinkable dendrimers having olefinic terminal groups in combination with long-chain terminal alkyl, polyether or polyester groups for reducing the viscosity of the composition, and the use of such radiation-curable compositions for the production of coatings, adhesives or radiation-curable printing inks.

WO 96/13558 discloses radiation-curable compositions of monomers and unsaturated polyesters, the polyester used being a hyperbranched polyester having unsaturated functionalities as terminal groups, and the use of such radiation-curable compositions for the production of coatings, such as automotive coatings, furniture coatings or radiation-curable printing inks. UV-curable printing inks comprise no solvents but can be printed only on specially equipped printing presses and thus give rise to additional capital costs. Furthermore, in the case of UV inks, the adhesion of the ink film to important print media such as polyester, polyamide or polypropylene, is frequently unsatisfactory so that many users prefer liquid printing inks.

It is an object of the present invention to provide improved printing inks, in particular improved printing inks, which have very good adhesion to the print media even without the addition of adhesion promoters and which are simple and cheap to prepare. It is a particular object of the present invention to provide improved liquid printing inks for printing on nonabsorptive print media, such as plastics films or metal foils. It is a further object of the present invention to provide improved printing lacquers for priming unprinted print media or overcoating printed print media, in particular nonabsorptive print media.

We have found, surprisingly, that this object is achieved by the use of hyperbranched polymers having functional groups.

Accordingly, liquid printing inks for flexographic and/or gravure printing, comprising solvent, colorant, if required additives and, as a binder, at least one hyperbranched polymer having functional groups, have been found. Moreover, printing lacquers for priming unprinted print media or overcoating printed print media, comprising solvent, if required additives and, as a binder, at least one hyperbranched polymer having functional groups, have been found. Furthermore, the use of hyperbranched polymers having functional groups for the preparation of printing inks and printing lacquers, in particular as binders of printing inks and printing lacquers, has been found.

Regarding the present invention, the following may be stated specifically:

The present invention is carried out using hyperbranched polymers in the actual sense, i.e. polymers having a nonuniform molecular composition and structure.

Hyperbranched polymers having functional groups can be synthesized in a manner known in principle, using $AB_x$, preferably $AB_2$, monomers. The $AB_2$ monomers can on the one hand be completely incorporated in the form of branches or they can be incorporated as terminal groups, i.e. may still have two free B groups, or they can be incorporated as linear groups having one free B group. Depending on the degree of polymerization, the hyperbranched polymers obtained have a more or less large number of B groups, either as terminal groups or as side groups. Further information on hyperbranched polymers and their synthesis are to be found, for example, in J.M.S.—Rev. Macromol. Chem. Phys., C37(3), 555-579 (1997), and the literature cited therein.

The choice of hyperbranched polymers for the preparation of printing inks is in principle not limited to a specific polymer class. Depending on the desired properties of the printing ink, the person skilled in the art makes a choice from the polymer classes possible in principle. However, hyperbranched polyesters, hyperbranched polyethers, hyperbranched polyurethanes, hyperbranched polyureapolyurethanes, hyperbranched polyureas, hyperbranched polyaminest hyperbranched polyamides, hyperbranched polyetheramides and hyperbranched polyesteramides have proven particularly suitable for the preparation of printing inks. Hyperbranched polyurethanes, hyperbranched polyureapolyurethanes, hyperbranched polyethers, hyperbranched polyesters and hyperbranched polyesteramides are very particularly preferred.

Hyperbranched and highly functional polymers obtained by polymerization of $AB_2$ molecules can be used in principle as such for the preparation of printing inks, provided that the functional groups obtained in the course of the respective embodiment of the synthesis are suitable for the desired application.

However, the B groups originally present can advantageously be converted with regard to their functionality by polymer-analogous reaction with compounds suitable for this purpose. In this way, polymers particularly adapted to the respective use of the printing ink are obtainable.

Examples of suitable functional groups which can be introduced by means of suitable reactants comprise in particular acidic or base groups having H atoms and derivatives of said groups, such as —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$ or —NHCONHR, without it being intended to limit the list thereto. If possible in principle, the functional groups can also be converted into the corresponding salts with the aid of suitable acids or bases. The radicals R of said groups are as a rule straight-chain or branched alkyl radicals or alkyl radicals which may also be further substituted. For example, they are $C_1$-$C_8$-alkyl radicals or $C_5$-$C_{12}$-aryl radicals. Other functional groups, for example —CN or —OR, can also be used.

The functional groups of the hyperbranched polymers can, if required, also be converted with regard to their functionality. Compounds used for conversion of functionality can contain on the one hand the desired functional group to be newly introduced and a second group which is capable of reacting with the B groups of the hyperbranched polymer used as starting material, with the formation of a bond. An example of this is the reaction of an isocyanate group with a hydroxycarboxylic acid or an amino carboxylic acid with the formation of an acid functionality or the reaction of an OH group with acrylic anhydride with the formation of a reactive acrylic double bond.

However, it is also possible to use monofunctional compounds with which existing groups are merely modified. For example, alkyl halides can be used for quaternizing primary, secondary or tertiary amino groups present.

The conversion of the hyperbranched polymers with regard to their functionality can advantageously be effected immediately after the polymerization reaction or in a separate reaction.

Functional groups which have sufficiently acidic H atoms can be converted into the corresponding salts by treatment with suitable bases. Analogously, functional basic groups can be converted into the corresponding salts using suitable acids. Thus it is possible to obtain, for example, water-soluble or water-dispersible hyperbranched polymers.

Hyperbranched polymers which have different types of functionality can also be produced. This can be effected, for example, by reaction with a mixture of different compounds for conversion of functionality or by reacting only some of the functional groups originally present.

Furthermore, it is possible to produce compounds of mixed functionalities, by using monomers of the type ABC or $AB_2C$ for the polymerization, where C is a functional group which is not reactive with A or B under the reaction conditions chosen.

According to the invention, the hyperbranched polymers having functional groups are used for the preparation of printing inks or printing lacquers. They are suitable in particular as binders. The novel liquid printing inks for flexographic and gravure printing comprise at least one solvent or a mixture of different solvents, at least one colorant, one or more binders and optionally further additives.

The novel printing lacquers for priming unprinted print media or overcoating printed print media comprise at least one solvent or a mixture of different solvents, one or more binders and optionally further additives.

At least one of the binders is a hyperbranched polymer having functional groups. It is also possible to use a plurality of different hyperbranched polymers as binders.

The degree of polymerization, molar mass and type and number of functional groups can be chosen by a person skilled in the art according to the intended application.

—COOH, —COOR, —CONH$_2$, —OH, —NH$_2$, —NHR and —SO$_3$H have proven particularly useful as functional groups. OH-terminated or COOH-terminated hyperbranched polymers have proven very particularly advantageous for packaging printing inks for printing on polyolefin, PET or polyamide films. The use of hyperbranched polymers which comprise both OH and COOH groups is particularly advantageous for this intended use.

The hyperbranched polymers used generally have on average at least 4 functional groups. The number of functional groups has no upper limit in principle. However, products having too large a number of functional groups frequently have undesirable properties, for example poor solubility or a very high viscosity. The hyperbranched polymers used according to the invention therefore generally have not more than on average 100 functional groups. Preferably, the hyperbranched polymers have from 4 to 30, particularly preferably from 4 to 20, functional groups.

The molar masses of the hyperbranched polymers used according to the invention depend on the respective polymer class and on the respective use and are chosen accordingly by a person skilled in the art. However, products having a weight average molar mass $M_W$ of from 500 to 50,000, preferably from 1000 to 20,000, particularly preferably 1000-10,000, g/mol have proven useful.

The hyperbranched polymers can be used as a mixture with other binders, provided that no undesirable effects, for example precipitates, occur as a result of the mixing. Examples of further binders for liquid printing inks include polyvinylbutyral, nitrocellulose, polyamides, polyacrylates and polyacrylate copolymers. The use of hyperbranched polymers as a mixture with nitrocellulose has proven particularly advantageous. The binders used usually account for 5-30% by weight, based on the sum of all components.

Solvents serve for dissolving the binders, but they also serve for establishing important properties, such as the viscosity, or for establishing the drying rate. The type of solvent depends on the respective intended use of the printing ink, and the solvents customary for liquid printing inks can in principle be used in a known manner as solvents or as components of solvent mixtures. This choice is limited only by the fact that the hyperbranched polymer used in each case must have sufficient solubility in the solvent. Examples of such solvents or components of solvent mixtures include hydrocarbons such as toluene or xylene, alcohols, for example ethanol, 1-propanol, 2-propanol, ethylene glycol, propylene glycol, or diethylene glycol, substituted alcohols, such as ethoxypropanol, esters, for example ethyl acetate, isopropyl acetate, n-propyl or n-butyl acetate. Mixtures of different solvents may also be used. Furthermore, water or a water-containing solvent mixture is in principle suitable as a solvent. Depending on the type of printing ink, usually from 50 to 80% by weight, based on the sum of all components, of solvent are used.

The colorants used may be the conventional dyes and in particular conventional pigments. Examples are inorganic pigments, for example titanium dioxide pigments or iron oxide pigments, interference pigments, carbon blacks, metal powders, in particular aluminum, brass or copper powder, and organic pigments, such as azo, phthalocyanine or isoindoline pigments. Of course, mixtures of different dyes or colorants may also be used, and moreover soluble organic dyes. Usually from 5 to 25% by weight, based on the sum of all components, of colorants are used.

Of course, printing lacquers contain no colorants.

The novel printing inks or printing lacquers can optionally comprise further additives and assistants. Examples of additives and assistants are fillers, such as calcium carbonate, hydrated alumina, aluminum silicate or magnesium silicate. Waxes increase the abrasion resistance and serve for reducing the friction. Examples are in particular polyethylene waxes, oxidized polyethylene waxes, petroleum waxes and ceresin waxes. Fatty acid amides can be used for increasing the surface smoothness.

Plasticizers serve for increasing the resilience of the dried film. Examples are phthalates, such as dibutyl phthalate, diisobutyl phthalate or dioctyl phthalate, citric acid esters or esters of adipic acid. Dispersants may be used for dispersing the pigments. In the case of the novel liquid printing inks or printing lacquers, adhesion promoters can advantageously be dispensed with, without it being intended thereby to rule out the use of adhesion promoters. The total amount of all additives and assistants usually does not exceed 20% by weight, based on the sum of all components, and is preferably 0-10% by weight.

The preparation of the novel liquid printing inks can be carried out in a manner known in principle, by thorough mixing or dispersing of the components in conventional apparatuses, for example dissolvers, stirred ball mills or a tree-roll mill. Advantageously, a concentrated pigment dispersion comprising some of the components is first prepared and is subsequently further processed with other components and further solvent to give the finished printing ink.

Compared with the corresponding products comprising conventional binders, the novel liquid printing inks or printing lacquers have substantially improved adhesion in particular to nonabsorptive print media, such as metal foils or plastics films, both in reverse printing and in frontal printing. The addition of adhesion promoters is as a rule not necessary. Owing to these properties, they are also very useful for the production of laminated packaging.

The use of hyperbranched polymers having functional groups is not restricted to liquid printing inks. Of course, the hyperbranched polymers having functional groups can also be used for the preparation of pasty printing inks, for example for offset, letterpress or screen printing. Instead of the low-boiling solvents, high-boiling solvents for example mineral oils or vegetable oils, such as soyabean oil, are used for this purpose in a manner known in principle.

The examples which follow illustrate the invention without restricting its scope:

The following hyperbranched polymers were used for the examples:

Polymer 1: Hyperbranched polyureapolyurethane obtained from hexamethylene diisocyanate (HDI) and diethanolamine (DEA), OH-terminated 672 g of HDI, dissolved in 672 g of dimethylacetamide (DMAc), were initially taken with blanketing with nitrogen and were cooled to 0° C. At this temperature, a solution of 422 g of diethanolamine in 422 g of DMAC was then added in the course of 120 minutes with thorough stirring. After the addition, the reaction solution was heated to 50° C. and the decrease in the NCO content was monitored titrimetrically. When an NCO content of 3.4% by weight had been reached, the mixture was cooled to 20° C., a further 162 g of diethanolamine, dissolved in 162 g of DMAc, were added and stirring was continued for 30 minutes. The reaction solution was then freed from the solvent in a rotary evaporator under reduced pressure. The reaction product had the following parameters:

Average molar mass, calc.: 1840 g/mol
Average functionality: about 9 OH

Polymer 2: Hyperbranched polyureapolyurethane obtained from hexamethylene diisocyanate (HDI) and diisopropanolamine (DIIPA), OH-terminated 672 g of HDI, dissolved in 672 g of dry tetrahydrofuran (THF), were initially taken with blanketing with nitrogen and were cooled to 0° C. At this temperature, a solution of 532 g of DIIPA in 532 g of THF was added in the course of 60 minutes with thorough stirring. After the addition, the reaction mixture was heated to 50° C. and the decrease in the NCO content was monitored titrimetrically. When an NCO content of 2.2% by weight had been reached, the mixture was cooled to 20° C., a further 180 g of DIIPA, dissolved in 180 g of THF, were added and stirring was continued for 30 minutes. The reaction solution was then freed from the solvent in a rotary evaporator under reduced pressure. The reaction product had the following parameters:

Average molar mass, calc.: 1037 g/mol
Average functionality: about 6 OH

Polymer 3: Hyperbranched polyurethane obtained from isophorone diisocyanate (IPDI), trimethylolpropane (TMP) and β-alanine, COOH-terminated 1000 g of IPDI were initially taken with blanketing with nitrogen and 300 g of TMP, dissolved in 1300 g of ethyl acetate, were added in the course of 1 minute with thorough stirring. After 0.2 g of dibutyltin dilaurate had been metered in, the reaction mixture was stirred at 50° C. and the decrease in the NCO content was monitored titrimetrically. When an NCO content of 4.2% by weight had been reached, 75 g of tosyl isocyanate were added as a stop. Stirring was continued for a further hour, after which the solvent was removed in a rotary evaporator. The reaction product had an average functionality of 7 with respect to NCO.

400 g of this NCO-containing reaction product were dissolved in 400 g of dry acetone and heated to 50° C. A mixture consisting of 16 g of NaOH in 160 g of water and 36 g of β-alanine in 80 g of acetone was then added. After the addition, a solid separated out. The suspension was stirred for a further 30 minutes at 50° C. and the solvent mixture was then removed in a rotary evaporator under reduced pressure. The residue was dissolved in 2000 ml of water and neutralized with dilute hydrochloric acid. The end product which separated out was filtered off with suction and dried under reduced pressure.

Average molar mass, calc.: 3758 g/mol
Average functionality: about 7 COOH

Polymer 4: Hyperbranched polyurethane obtained from isophorone diisocyanate (IPDI), trimethylolpropane (TMP), HDI polymer and β-alanine, COOH-terminated 500 g of IPDI were initially taken with blanketing with nitrogen and 150 g of TMP, dissolved in 650 g of ethyl acetate, were added in the course of 1 minute with thorough stirring. After 0.2 g of dibutyltin dilaurate had been metered in, the reaction mixture was stirred at 50° C. and the decrease in the NCO content was monitored titrimetrically. When an NCO content of 5.8% by weight had been reached, 172 g of BASONAT HI 100 (HDI-based polyisocyanate, BASF AG, NCO-content 22% by weight) were added as a stop. Stirring was continued for a further 3 hours and the solvent was then removed in a rotary evaporator. The reaction product had an average functionality of about 13 with respect to NCO.

1000 g of this NCO-containing reaction product were dissolved in 1000 g of dry acetone. Thereafter, a mixture consisting of 47 g of NaOH and 470 g of water and 105 g of β-alanine in 235 g of acetone was added, the reaction mixture was stirred for a further 30 minutes at 40° C. and the solvent mixture was then removed in a rotary evaporator under reduced pressure. The residue was dissolved in water and neutralized with dilute hydrochloric acid and the end product which separated out was filtered off with suction and dried under reduced pressure.

Average molar mass, calc.: 7248 g/mol
Average functionality: about 13 COOH

Polymer 5: Hyperbranched polyurethane obtained from 2,4-toluoylene diisocyanate (TDI), trimethylolpropane, 4,4'-diphenylmethane diisocyanate (MDI) and hydroxypivalic acid, COOH-terminated 400 g of 2,4-TDI were initially taken with blanketing with nitrogen and 155 g of TMP, dissolved in 555 g of 2-butanone, were added in the course of 1 minute with thorough stirring. After 0.2 g of dibutyltin dilaurate had been metered in, the reaction mixture was stirred at 60° C. and the decrease in the NCO content was monitored titrimetrically. When an NCO content of 6.5% by weight had been reached, 94 g of diphenylmethane 4,4'-diisocyanate, dissolved in 94 g of 2-butanone, were added and the mixture was stirred for 3 hours at 60° C. Thereafter, 114 g of hydroxypivalic acid, dissolved in 280 g of 2-butanone, and 0.1 g of dibutyltin dilaurate were added, stirring was continued for 8 hours at 60° C. and finally 100 g of methanol were added. The solvent mixture was removed in a rotary evaporator and the product was dried under reduced pressure.

Average molar mass, calc.: 2723 g/mol
Average functionality: about 6 COOH

Polymer 6: Hyperbranched polyurethane obtained from hexamethylene diisocyanate (HDI), dimethylolpropionic acid (DMPA) and trimethylolpropane (TMP), COOH— and OH-terminated 100 g of HDI, dissolved in 250 g of dimethylacetamide (DMAc), were initially taken with blanketing with nitrogen. 79.7 g of dimethylolpropionic acid, dissolved in 115 g of DMAc, were then added in the course of 1 minute with thorough stirring. After 0.2 g of dibutyltin dilaurate had been metered in, the reaction mixture was heated to 70° C. and the decrease in the NCO content was monitored titrimetrically. When an NCO content of 1.5% by weight had been reached, 13.5 g of trimethylolpropane, dissolved in 50 g of DMAc, were added and the mixture was stirred for a further hour at 70° C. The product was then freed from the solvent in a rotary evaporator under reduced pressure.

Average molar mass, calc.: 2793 g/mol
Average functionality: about 9 COOH and 3 OH Polymer 7: Hyperbranched polyurethane obtained from isophorone diisocyanate (IPDI), dimethylolpropionic acid (DMPA), trimethylolpropane (TMP) and polytetrahydrofuran, COOH— and OH-terminated 222 g of IPDI were initially taken with blanketing with nitrogen. A mixture of 67 g of TMP and 67 g of dimethylolpropionic acid, dissolved in 356 g of DMAc, was then added in the course of 1 minute with thorough stirring. After 0.4 g of dibutyltin dilaurate had been metered in, the reaction mixture was heated to 60° C. and stirred at this temperature and the decrease in the NCO content was monitored titrimetrically. After an NCO content of 1.0% by weight had been reached, 32 g of PolyTHF 250 (polytetrahydrofuran, average molar mass 250 g/mol, BASF AG) were added and stirring was continued for 3 hours at 60° C. During this time, the NCO content of the mixture decreased to 0%. The product was then freed from the solvent in a rotary evaporator at 60° C. under reduced pressure.

Average molar mass, calc.: 4408 g/mol

Average functionality: about 6 COOH and 8 OH

Polymer 8: Hyperbranched polyurethane obtained from hexamethylene diisocyanate (HDI), dimethylolpropionic acid (DMPA) and trimethylolpropane (TMP), COOH— and OH-terminated 400 g of HDI were initially taken at room temperature with blanketing with nitrogen. A mixture of 160 g of dimethylolpropionic acid, 160 g of trimethylolpropane and 720 g of DMAc was then added in the course of 2 minutes with thorough stirring. After 0.5 g of dibutyltin dilaurate had been metered in, the reaction mixture was heated to 70° C. and the decrease in the NCO content was monitored titrimetrically. When an NCO content of 0.9% by weight had been reached, 100 g of methanol were added and stirring was continued for a further 30 minutes at 70° C. The product was then freed from the solvent in a rotary evaporator under reduced pressure.

Average molar mass, calc.: 2451 g/mol

Average functionality: about 4 COOH and 5 OH

Polymer 9: Hyperbranched polyesteramide, HYBRANE H 1500, DSM N.V., OH-terminated Average molar mass, calc.: 1500 g/mol Average functionality: about 8 OH Novel Printing Inks Comprising Hyperbranched Polymers The quality of the novel liquid printing inks was determined on the basis of the adhesive strength of the printing ink.

The adhesive strength of the printing ink film was determined on various print media.

EXAMPLES 1-18

Determination of adhesive strengths of the printing ink systems containing hyperbranched polymers on various print media in comparison with a standard system.

Tesa Strength Measurement Method

The Tesa strength test method is used for determining the adhesion of a printing ink film on the print medium.

Sample Preparation

The ink, diluted to printing viscosity, is pressed onto the prescribed printing medium or applied using a 6 μm doctor blade.

Test Procedure

A strip of Tesa tape (19 mm wide adhesive tape (article BDF 4104, Beiersdorf AG), is stuck onto the printing ink film, pressed on evenly and peeled off again after 10 seconds. This process is repeated 4 times in the same area of the test specimen, in each case using a new strip of Tesa tape. Each Tesa strip is stuck in succession onto a piece of white paper, or on black paper in the case of white ink. The test is carried out immediately after application of the ink.

Evaluation

The surface of the test specimen is inspected visually for damage. Rating is from 1 (very poor) to 5 (very good).

The following standard formulation (parts by weight) was chosen for the examples:

| | |
|---|---|
| 70.0 | Pigment preparation (BASF Drucksysteme) |
| 8.0 | Nitrocellulose (Wolf) |
| 1.0 | Oleamide (Croda) |
| 0.5 | PE waxes (BASF AG) |
| 2.0 | Dibutyl phthalate (Brenntag) |
| 10.5 | Ethanol |
| 6.0* | Hyperbranched polymer as cobinder (according to Tables 1 and 2) |
| 2.0** | Titanium chelate (Du Pont) |

*= The hyperbranched polymer was prepared as a 75% strength solution in ethanol
**= Titanium chelate was omitted in the second test series (Table 2).

TABLE 1

Standard binder in comparison with hyperbranched polymers

| | | Print medium (film) | | |
|---|---|---|---|---|
| Example | Cobinder | PP | PET Melinex 800 | PA Walomid XXL |
| 1 (comparison) | Standard polyurethane (PUR 7313, BASF) | 5 | 3 | 1 |
| 2 | Polymer 1 | 4 | 5 | 4.5 |
| 3 | Polymer 2 | 5 | 5 | 4.5 |
| 4 | Polymer 3 | 3.5 | 4.5 | 3.5 |
| 5 | Polymer 5 | 5 | 3 | 4 |
| 6 | Polymer 6 | 5 | 5 | 5 |
| 7 | Polymer 7 | 5 | 4 | 5 |
| 8 | Polymer 8 | 5 | 5 | 3 |
| 9 | Polymer 9 | 5 | 5 | 1 |

TABLE 2

Systems without titanium chelate as adhesion promoter

| | | Print medium (film) | | |
|---|---|---|---|---|
| Example | Polymer | PP | PET Melinex 800 | PA Walomid XXL |
| 10 (comparison) | Standard polyurethane (PUR 7313, BASF) | 1 | 1 | 1 |
| 11 | Polymer 1 | 4 | 4.5 | 4.5 |
| 12 | Polymer 3 | 4 | 4.5 | 4 |
| 13 | Polymer 4 | 5 | 4.5 | 4.5 |
| 14 | Polymer 5 | 5 | 5 | 3 |
| 15 | Polymer 6 | 5 | 5 | 5 |
| 16 | Polymer 7 | 5 | 4 | 5 |
| 17 | Polymer 8 | 5 | 5 | 5 |
| 18 | Polymer 9 | 4 | 4.5 | 4.5 |

PP = Polypropylene
PET = Polyethylene terephthalate
PA = Polyamide

The examples show that the adhesion of the novel liquid printing ink to various substrates is considerably better than with the use of conventional non-hyperbranched polymers as the binder. For the use of conventional binders, it is essential to add an adhesion promoter in order to be able to obtain useable results at least in some cases. On PA, the adhesion is unsatisfactory in spite of an adhesion promoter. By replacing the conventional binders with hyperbranched polymers, the adhesive strength can be increased. Particularly advantageously, adhesion promoters can be dispensed with. With hyperbranched polymers, excellent adhesion is nevertheless achieved in all cases.

We claim:

1. A liquid printing ink for flexographic and/or gravure printing, comprising
   a) at least two binders,
   b) a solvent or a mixture of different solvents,
   c) one or more colorants,
   and optionally further additives, wherein
   the at least two binders (a) constitute from 5 to 30% by weight of the printing ink, and at least one of the binders is a hyperbranched polymer which has a non-uniform molecular composition and structure and has functional groups, and at least one of the binders is a nitrocellulose, wherein the hyperbranched polymer is a hyperbranched polyurea polyurethane, a hyperbranched polyamine, and/or a hyperbranched polyesteramide,
   the solvent or the mixture of different solvents (b) constitutes from 50 to 80% by weight of the printing ink, and any solvent as well as any mixture of different solvents is selected from the group consisting of hydrocarbons, alcohols, substituted alcohols, esters and mixtures thereof, and
   the one or more colorants (c) constitute from 5 to 25% by weight of the printing ink,
   and the ink comprises no water.

2. The printing ink of claim 1, wherein the functional groups of the hyperbranched polymers are identical or different functional groups selected from the group consisting of —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, and —NHCONHR or, if possible, are salts of these groups.

3. The printing ink of claim 2, wherein the functional groups are —OH and/or —COOH.

4. The printing ink of claim 1, wherein the hyperbranched polymer has on average at least 4 functional groups.

5. The printing ink of claim 4, wherein the hyperbranched polymer has from 4 to 30 functional groups.

6. The printing ink of claim 1, wherein the hyperbranched polymer is water-soluble or water-dispersible.

7. A printing lacquer for priming unprinted print media or overcoating printed print media, comprising
   a) at least two binders, and
   b) a solvent or a mixture of different solvents,
   and optionally further additives, wherein
   the at least two binders (a) constitute from 5 to 30% by weight of the lacquer, and at least one of the binders is a hyperbranched polymer which has a non-uniform molecular composition and structure and has functional groups, and at least one of the binders is a nitrocellulose, and wherein the at least one hyperbranched polymer is selected from the group of hyperbranched polyurea polyurethanes, hyperbranched polyureas, hyperbranched polyesters, hyperbranched polyamines, hyperbranched polyamides, and hyperbranched polyesteramides,
   the solvent or the mixture of different solvents (b) constitutes from 50 to 80% by weight of the lacquer, and any solvent as well as any mixture of different solvents is selected from the group consisting of hydrocarbons, alcohols, substituted alcohols, esters and mixtures thereof,
   and the printing lacquer comprises no water and no colorants.

8. A process for the preparation of printing inks, said process comprising mixing or dispersing at least one hyperbranched polymer binder having functional groups with other components,
   wherein the hyperbranched polymer having functional groups is mixed with one or more further binders, one or more solvents, one or more colorants, and optionally further additives in amounts adapted to obtain a composition comprising
   a) the hyperbranched polymer and the one or more further binders,
   b) the one or more solvents,
   c) one or more colorants,
   and optionally further additives, wherein
   the hyperbranched polymer and the one or more further binders (a) constitute from 5 to 30% by weight of the composition, wherein at least one of the further binders is a nitrocellulose, and wherein the hyperbranched polymer is a hyperbranched polyurea polyurethane, a hyperbranched polyamine, and/or a hyperbranched polyesteramide,
   the one or more solvents (b) constitute from 50 to 80% by weight of the composition and any one of the one or more solvents is selected from the group consisting of hydrocarbons, alcohols, substituted alcohols and esters, and
   the one or more colorants (c) constitute from 5 to 25% by weight of the composition,
   and the ink comprises no water.

9. The process of claim 8, wherein the functional groups are identical or different functional groups selected from the group consisting of —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, and —NHCONHR or, if possible, are salts of these groups.

10. The printing ink of claim 1, wherein the functional groups of the hyperbranched polymers are identical or different functional groups selected from the group consisting of —COOH, —CONH$_2$, —OH, —SH, —SO$_3$H, —NHCONH$_2$, and salts of these groups.

11. The process of claim 9, wherein the functional groups are —OH and/or —COOH.

12. The process of claim 8, wherein the hyperbranched polymer has on average at least 4 functional groups.

13. The process of claim 12, wherein the hyperbranched polymer has from 4 to 30 functional groups.

14. The printing lacquer of claim 7, comprising at least one hyperbranched polymer selected from the group of hyperbranched polyurea polyurethanes, hyperbranched polyamines, and hyperbranched polyesteramides.

15. The printing lacquer of claim 7, wherein the functional groups of the hyperbranched polymers are identical or different functional groups selected from the group consisting of —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, and —NHCONHR or, if possible, are salts of these groups.

16. The printing lacquer of claim 7, wherein the functional groups are —OH and/or —COOH.

17. A process for the preparation of a printing lacquer, said process comprising mixing or dispersing at least one hyperbranched polymer binder having functional groups with other components,
   wherein the hyperbranched polymer having functional groups is mixed with one or more further binders, one or more solvents and optionally further additives in amounts adapted to obtain a composition comprising a) the hyperbranched polymer and the one or more further binders,
b) the one or more solvents,
and optionally further additives, wherein
the hyperbranched polymer and the one or more further binders (a) constitute from 5 to 30% by weight of the composition, wherein at least one of the further binders is a nitrocellulose, and wherein the at least one hyperbranched polymer is selected from the group of hyperbranched polyurea polyurethanes, hyperbranched polyureas, hyperbranched polyesters, hyperbranched polyamines, hyperbranched polyamides, and hyperbranched polyesteramides,
the one or more solvents (b) constitute from 50 to 80% by weight of the composition and any one of the one or more solvents is selected from the group consisting of hydrocarbons, alcohols, substituted alcohols and esters, and
the one or more colorants (c) constitute from 5 to 25% by weight of the composition,
and the lacquer comprises no water and no colorants.

18. The process of claim 17, wherein the at least one hyperbranched polymer is selected from the group of hyperbranched polyurea polyurethanes, hyperbranched polyamines, and hyperbranched polyesteramides.

19. The process of claim 17, wherein the functional groups of the hyperbranched polymers are identical or different functional groups selected from the group consisting of —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, and —NHCONHR or, if possible, are salts of these groups.

20. The process of claim 17, wherein the functional groups are —OH and/or —COOH.

* * * * *

UNITED STATES PATENT AND TRADEMARK OFFICE
CERTIFICATE OF CORRECTION

| | | |
|---|---|---|
| PATENT NO. | : 7,939,583 B2 | Page 1 of 1 |
| APPLICATION NO. | : 12/370099 | |
| DATED | : May 10, 2011 | |
| INVENTOR(S) | : Bruchmann et al. | |

It is certified that error appears in the above-identified patent and that said Letters Patent is hereby corrected as shown below:

IN THE CLAIMS:

In Claim 7, col. 11, indicated line 55:
    "hyperbranched polvurea" should read >hyperbranched polyurea<

In Claim 8, col. 12, indicated line 18:
    "hvperbranched" should read >hyperbranched<

Signed and Sealed this
Twenty-first Day of June, 2011

David J. Kappos
*Director of the United States Patent and Trademark Office*